(12) United States Patent
Doolittle

(10) Patent No.: US 8,191,308 B2
(45) Date of Patent: Jun. 5, 2012

(54) CHEMICAL SHELL FOR INSERTION INTO A TREE

(76) Inventor: Glayne Doolittle, Omaha, NE (US)

( * ) Notice: Subject to any disclaimer, the term of this patent is extended or adjusted under 35 U.S.C. 154(b) by 268 days.

(21) Appl. No.: 12/287,252

(22) Filed: Oct. 7, 2008

(65) Prior Publication Data

US 2010/0083570 A1    Apr. 8, 2010

(51) Int. Cl.
    *A01G 29/00*    (2006.01)
(52) U.S. Cl. .......................................... 47/57.5
(58) Field of Classification Search .............. 47/48.5, 47/57.5; 43/126; *A01G 29/00*
    See application file for complete search history.

(56) References Cited

U.S. PATENT DOCUMENTS

| | | | |
|---|---|---|---|
| 3,706,161 A | 12/1972 | Jenson | |
| 4,344,250 A | 8/1982 | Fahlstrom | |
| 4,793,474 A | 12/1988 | Drake | |
| 5,162,052 A * | 11/1992 | Hoffmann et al. | 47/8 |
| 5,341,594 A * | 8/1994 | Merving | 47/57.5 |
| 5,461,824 A * | 10/1995 | Cassell | 47/57.5 |
| 5,679,129 A | 10/1997 | Hon | |
| 6,216,388 B1 | 4/2001 | Miller et al. | |
| 6,706,344 B1 | 3/2004 | Harlowe, Jr. et al. | |
| 6,913,805 B2 | 7/2005 | Harlowe, Jr. et al. | |
| 2010/0115836 A1* | 5/2010 | Julian | 47/65.7 |
| 2010/0144534 A1* | 6/2010 | Pullen | 504/357 |

* cited by examiner

*Primary Examiner* — Son T Nguyen
*Assistant Examiner* — Shadi Baniani
(74) *Attorney, Agent, or Firm* — Dennis L. Thomte; Thomte Patent Law Office LLC

(57) ABSTRACT

A chemical shell for insertion into a tree comprising an elongated hollow tubular member having a closed first end and an open second end with a rim portion extending outwardly from the closed end. A non-aqueous chemical is contained within the tubular member and a water-soluble tubular sleeve extends over the open second end of the tubular member and at least a portion of the tubular member to maintain the chemical in the tubular member until the shell has been inserted into a tree so that the sap in the tree dissolves the sleeve to permit the chemical in the tubular member to be released into the tree when dissolved by the sap in the tree.

1 Claim, 2 Drawing Sheets

CHEMICAL SHELL FOR INSERTION INTO A TREE

BACKGROUND OF THE INVENTION

1. Field of the Invention

This invention relates to a chemical shell for insertion into a tree and more particularly to a chemical shell for insertion into a tree wherein the shell contains a non-aqueous chemical therein and wherein the shell is at least partially enclosed in a water-soluble sleeve.

2. Description of the Related Art

Non-limiting and non-exhaustive embodiments of the present invention are described with reference to the following figures, wherein like reference numerals refer to like parts throughout the various views unless otherwise specified.

Chemical shells or capsules have long been used in the treatment of trees. In some cases, a herbicide is contained inside the shell or capsule so that the tree being injected will die. In other cases, the shells or capsules contain insecticides, fertilizers, etc.

Chemical shells in the form of 22 caliber rifle shells have been inserted in the trees by an injection lance such as marketed by Arbor Systems of Omaha, Nebr., which drives the chemical shells into the tree. A problem associated with the prior art chemical shells is that it is difficult to maintain the chemical within the shell during manufacture, shipment, storage, etc. If a protective film or the like is placed around the chemical shell to maintain the chemical in the shell during manufacture, shipment, storage, etc. that film may prevent the chemical in the shell from being released into the tree sap upon injection of the shell into the tree. If a plug is positioned in the open end of the chemical shell to maintain the chemical in the shell, that plug takes up space which could be filled with chemical.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A chemical shell is described for insertion into a tree. The chemical shell contains a herbicide, a fertilizer, an insecticide, etc. The shell is comprised of an elongated metal hollow tubular member having a closed first end and an open second end with a rim portion extending outwardly from the closed first end. A non-aqueous chemical is enclosed in the tubular member. A water-soluble tubular sleeve extends over the open second end of the tubular member and at least a portion of the tubular member which maintains the chemical in the tubular member until the sap in the tree dissolves the sleeve to permit the chemical in the tubular member to be released into the tree when dissolved by the sap in the tree. In the preferred embodiment, the sleeve is preferably comprised of a water-soluble gelatin material but may be comprised of other suitable water-soluble materials. In the preferred embodiment, the tubular member is comprised of a metal material.

It is therefore a principal object of the invention to provide an improved chemical shell for insertion into a tree.

A further object of the invention is to provide a chemical shell for insertion into a tree wherein a non-aqueous chemical is contained within the shell and wherein a water-soluble sleeve embraces at least a portion of the shell to maintain the chemical in the shell until such time as the shell has been injected into a tree and the tree sap dissolves the sleeve and the chemical in the shell.

A further object of the invention is to provide a chemical shell which may be used to insert herbicides, insecticides, fertilizers, etc. into a tree.

Still another object of the invention is to provide a chemical shell for insertion into a tree with the shell being enclosed by a water-soluble sleeve to maintain the non-aqueous chemical in the shell during manufacture, shipment, storage, etc.

These and other objects will be apparent to those skilled in the art.

BRIEF DESCRIPTION OF THE DRAWINGS

FIG. 1 is a perspective view of an injection lance for inserting the chemical shell of this invention into a tree or the like;

DESCRIPTION OF THE PREFERRED EMBODIMENT

Figure 1:
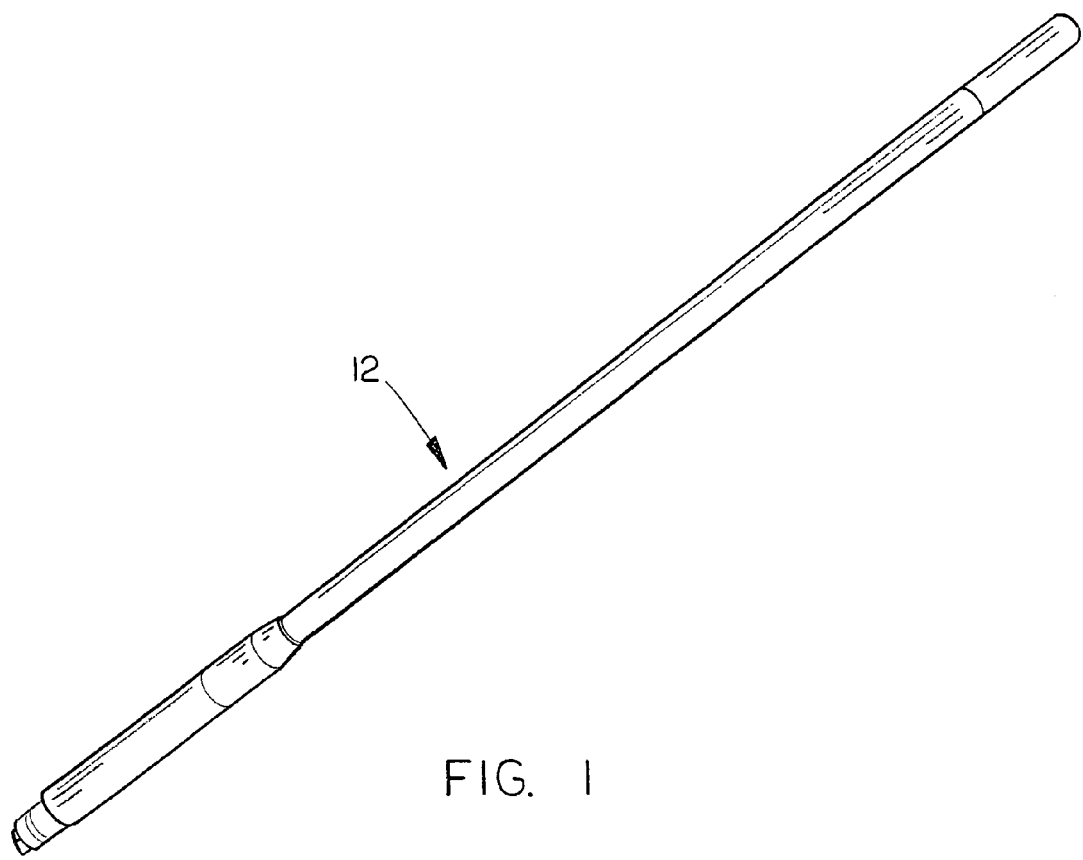
Figure 2:
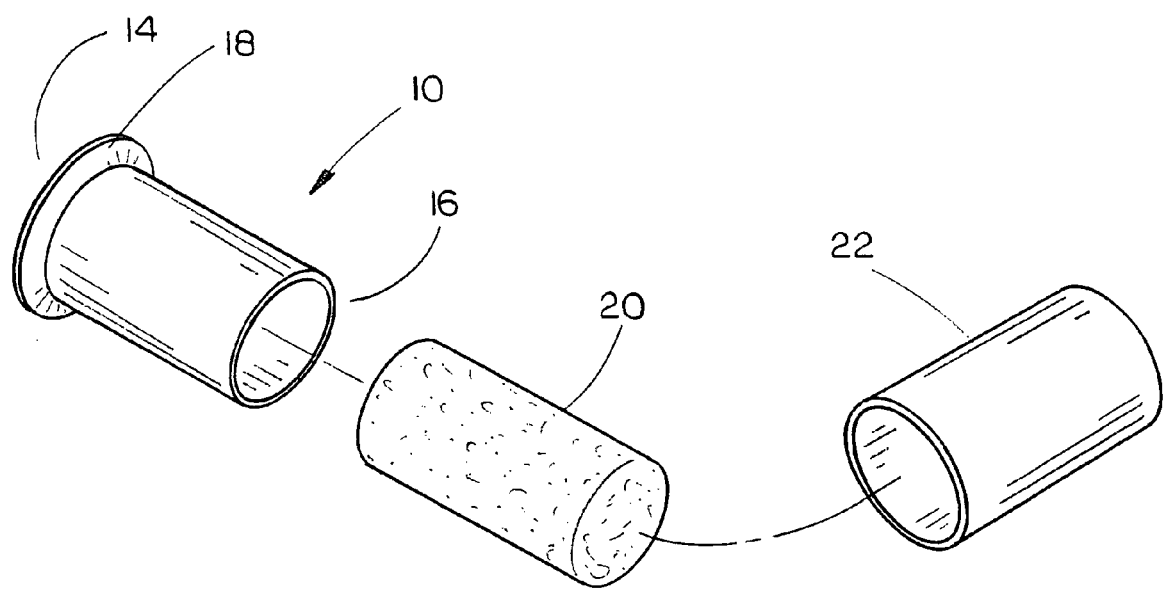
FIG. 2 is an exploded perspective view of the chemical shell of this invention.
Figure 3:
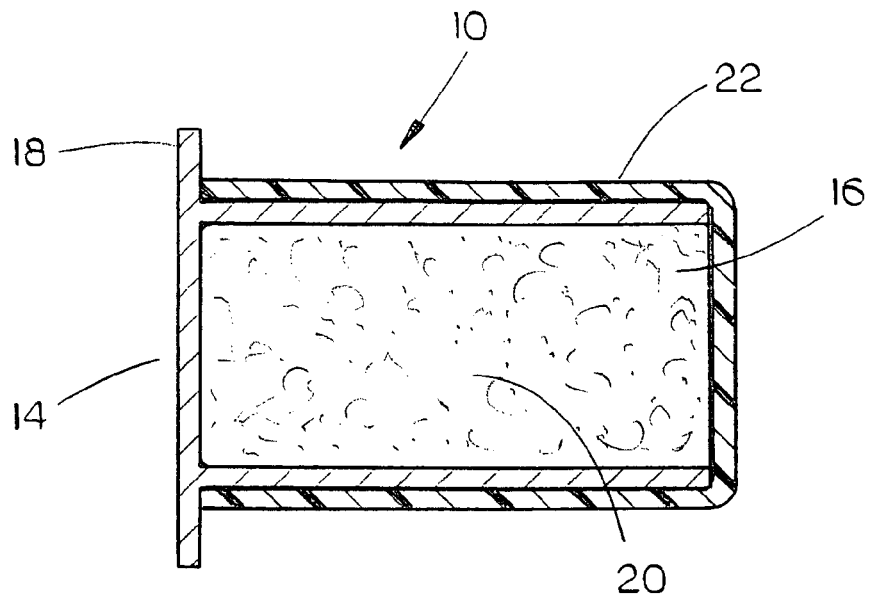
FIG. 3 is a sectional view of the chemical shell.
Figure 4:
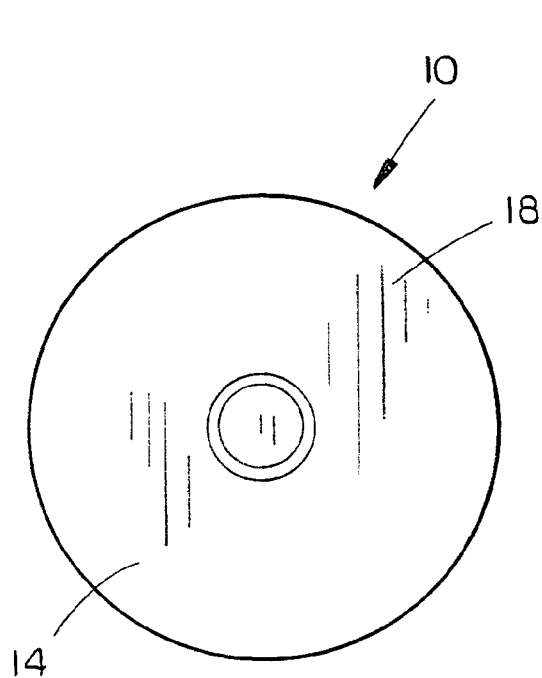
FIG. 4 is an end view of the chemical shell as viewed from the rim end thereof.
Figure 5:
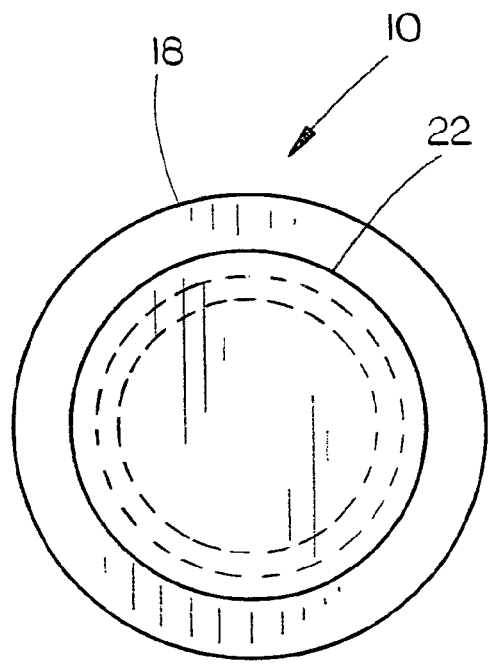
FIG. 5 is an end view of the chemical shell as viewed from the opposite end of the chemical shell.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The chemical shell of this invention is referred to generally by the reference numeral 10 and is designed to be inserted into a tree by an injection lance 12 such as sold as the EZ-Ject lance by Arbor Systems of Omaha, Nebr. Shell 10 is preferably a 22 caliber rifle shell having the primer removed therefrom and which is comprised of a metal material such as brass or the like. Shell 10 could be a larger or smaller caliber if so desired. Shell 10 is tubular in shape and has a closed end 14, an open end 16, and a rim 18 extending outwardly from end 14.

A non-aqueous chemical 20 is contained within shell 10 and may be a herbicide, an insecticide, a fertilizer, growth regulator, fungicide, etc. Shell 10 has a water-soluble tubular sleeve 22 positioned thereon which maintains the chemical 20 in the shell and which extends over the open end 16 and at least a portion of the shell 10.

Prior to insertion into the tree by the lance 12, the sleeve 22 maintains the chemical 20 in the shell during manufacture, shipment, storage, etc. Upon insertion into the tree by the lance 12, the sap in the tree dissolves the sleeve 22 which releases the chemical 20 in the shell 10 to permit the chemical 20 to be released into the tree. The rim 18 seals the opening in the tree caused by the insertion of the shell 10 thereinto.

Thus it can be seen that a novel chemical shell has been provided which utilizes a non-aqueous chemical therein and which is enclosed by a sleeve comprised of a water-soluble material such as gelatin so that upon injection of the shell into the tree, the sap in the tree will dissolve the water soluble material and will then dissolve the chemical 20 in the shell to release the chemical into the tree. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A chemical shell for insertion into a tree comprising:

an elongated, hollow tubular body member having a closed outer end and an open inner end with a rim portion extending transversely outwardly from said hollow tubular body member at said closed outer end thereof whereby said rim portion has a greater diameter than said tubular body member;

said tubular body member and said rim portion being comprised of a metal material;

said hollow tubular body member having continuous, constant diameter cylindrical inner and outer wall surfaces extending from said rim portion to said open inner end thereof;

a non-aqueous chemical in said tubular body member;

a hollow, water soluble tubular sleeve having a closed inner end, an open outer end, and continuous, constant diameter cylindrical inner and outer wall surfaces extending from said closed inner end to said open outer end thereof;

said tubular sleeve embracing and receiving said tubular body member therein so that said inner wall surface of said tubular sleeve is positioned closely adjacent said outer wall surface of said tubular body member and so that said closed inner end of said tubular sleeve closes said open inner end of said tubular body member to maintain said chemical in said tubular body member until said inner end of said tubular body member, having said tubular sleeve positioned thereon, has been driven into the tree whereby the sap in the tree will dissolve said inner end of said tubular sleeve thereby permitting the chemical in said tubular body member to be released into the tree only through said open inner end of said tubular body member.

* * * * *